Patented May 22, 1934

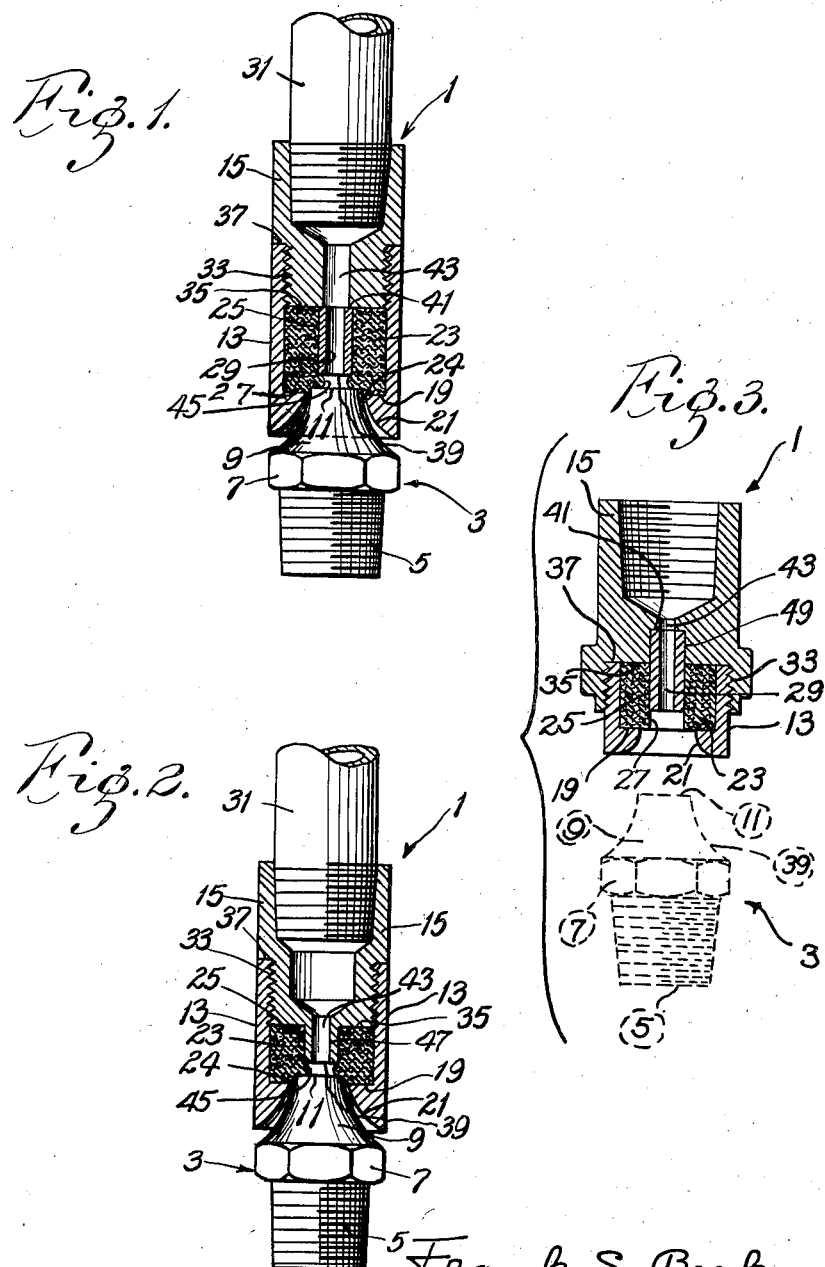

1,959,517

UNITED STATES PATENT OFFICE 1,959,517

COUPLER

Frank S. Barks, St. Louis, Mo.

Application April 20, 1931, Serial No. 531,440

1 Claim. (Cl. 285—161)

This invention relates to couplers and with regard to certain more specific features to an improved type of coupler for pressure lubrication.

Among the several objects of the invention may be noted the provision of a coupler for high pressure lubrication systems, adapted to provide a resilient sealing surface between said coupler and a fitting; and, a provision of a coupler of the class described which provides a dirt absorbing and sealing edge which is easy and economical to manufacture and the wearing parts of which are easily replaceable. Other objects will be in part obvious and in part pointed out hereinafter.

The invention accordingly comprises the elements and combinations of elements, features of construction, and arrangements of parts which will be exemplified in the structure hereinafter described, and the scope of the application of which will be indicated in the following claim.

In the accompanying drawing, in which is illustrated several of various possible embodiments of the invention, Fig. 1 is an axial section of a coupler applied to a fitting;

Fig. 2 shows a modified form of the coupler; and,

Fig. 3 shows another modified form of the coupler.

Similar reference characters indicate corresponding parts throughout the several views of the drawing.

Referring now more particularly to Fig. 1, there is shown at numeral 1 a coupler applicable by axial force to a fitting 3 to effect a seal between the coupler and fitting, said fitting and coupler being adapted to be used more particularly in high pressure lubrication systems.

The fitting 3 comprises a hollow member provided with threads at one end as shown at numeral 5, for threading the fitting into a bearing member to be lubricated. The fitting 3 is also provided with a wrench receiving, polygonal portion 7, and at its other end with a concave, truncated, conically-shaped portion 9. The end of the conical portion 9 provides a sealing surface 11.

The coupler 1 comprises a sleeve or guide 13 and a nozzle 15. The sleeve 13 has a bore 24 which terminates at a shoulder 19 at which a concentric opening 21 begins. The opening 21 is shaped to receive the conical portion 9 of the fitting 3 and to provide proper aligning of the portion 9 as it is received in the coupler 1. A packing 23, which has a passage 25 therethrough, is positioned in the bore 24 and is seated against the shoulder 19 and is thus prevented from movement from the member 13. The passage 25 is sufficiently small to provide edges 27 which overlap the edge portion of the opening 21, as shown in Fig. 3. A considerable portion or area of the passage 25 is provided with a tubular metallic lining 29.

The packing 23 is preferably composed of a resilient grease resisting composition, and comprises relatively thin alternate layers of canvas and rubber formed in planes which are normal to the axis of the device. The composition effects a uniform radial expansion throughout its length when stresses are applied parallel to its axis. However, other relatively soft packings may be used.

The nozzle 15 is adapted to receive tubing 31 which communicates with a pressure lubricating system or apparatus, said tubing having a flexible portion therein to permit movement of the coupler. The nozzle 15 is adapted to thread into the sleeve member 13 as shown at numeral 33. The lower end 35 of said nozzle 15 slightly compresses the resilient packing material 23 as the nozzle is tightly seated in the sleeve member 13 (see numeral 37). A passage 43 is formed in the nozzle 15 to provide communication between the tubing 31 and the bore or passage 25 of the packing 23.

The tubular lining 29 does not extend the total distance between the surface 35 of the nozzle 15 and the shoulder 19. A lower edge of the tubular lining 29 is provided with a sealing surface 39 to correspond with the sealing surface 11 of said fitting 3. The upper edge 41 of the tubular lining 29 abuts against the surface 35. The lining 29 prevents any radial expansion toward the axis of the packing 23, over that portion of the passage 25 which it lines. However, a part of the passage 25 is left unlined for purposes to be described.

The coupler 1 is applied to the fitting 3, by positioning the opening 21 of the coupler 1 over the truncated portion 9 and axially forcing the coupler 1 against the fitting 3. This operation forces the surface 11 of the fitting 1 against the edge 27 of the packing 23. The surface 35 of the nozzle 15 prevents any axial motion of the packing, but inasmuch as the packing 23 is composed of a resilient material, the stresses set up therein caused by the force exerted by the surface 11 against the packing, cause the packing 23 to tend to expand radially. The wall of the bore 24 and of the tubing 29 prevents any radial expansion of the material 23 along the tubing. But as is shown at numeral 45, the portion of the passage 25 which is unlined allows the material 23 to radially expand into the passage 25. This expanded portion 45 is caught between the surfaces 11 and 39, and as the coupler is forced still more tightly against the fitting 1, provides an effective sealing medium therebetween. The stresses set up in the material 23, causing it to tend to expand against the inner surface of the bore 24 and against the outer surface of the lining 29, prevent any escape of the grease or lubricating material along those surfaces.

The seal which is thus formed between the surfaces 11 and 39 is effective against a pressure of the order of thousands of pounds per square inch.

An advantage of this type of coupler is the flexibility with which it operates; the coupler 1 may be applied at an angle to the fitting 3, as is often necessary in lubrication of machinery, and still the packing 23 will provide an effective seal between the surfaces 39 and 11.

A further advantage of this coupler over the other types is the fact that dirt, which may be contained on the fitting 3 is resiliently seated in the packing 23 and does not affect the surface 11 of the fitting 1. The packing 23 may eventually become damaged by dirt which works into it, but it may then be readily replaced by a fresh packing.

Another advantage is that even though the surface 11 be substantially damaged, as by being nicked, a perfect seal may be effected at varying angles. The opening 21 serves as an aligning means.

Referring to Fig. 2, corresponding reference characters indicate corresponding parts shown in Fig. 1. The distinction of Fig. 2 over Fig. 1 lies in the replacing of the lining 29 by an extension 47, which extends from the nozzle 15 and serves the same purpose as the lining 29. The end of the extension or liner 47 is provided with a sealing surface 39, as was the tubular lining 29. The operation of the Fig. 2 modification is analogous to that of the Fig. 1 modification.

An advantage of this modification is that a smaller amount of packing is required. The length of the nozzle 47 is less than that of lining 29 because the nozzle 47 is more rigidly mounted and does not require increased length to steady it in the packing as does lining 29. A further advantage is gained by the positive alignment of the nozzle 47 with the mouth or opening 21 of the connecting piece 13.

Referring to Fig. 3 corresponding reference characters indicate corresponding parts shown and described in Figs. 1 and 2. The modification of Fig. 3 differs from the modification shown in Fig. 1 in that the tubular lining 29 is slidably seated in a bore 49 provided in the nozzle 15. Furthermore, the nozzle member 15 instead of being provided with external threads 33 is now provided with corresponding internal threads, whereby the connecting member 13 now threads into rather than onto said member 15. The coupler and fitting of this modification are used in the same way as in the preceding modifications, and the operation of parts is substantially the same.

An advantage of providing a bore 49 for seating the tubular lining 29 is that the tubular lining 29 is now held rigidly aligned with the mouth or opening 21. The tubular lining 29 in the Fig. 1 modification is only resiliently held in alignment with the mouth 21 by the packing 23. Another advantage of the Fig. 3 form is that the liner 29 may be supplied in flush position within replacement packing pieces 23. The liner is then automatically positioned as applications of the coupling are made.

The term "high pressure" herein refers to pressures of the order of five hundred pounds per square inch, or more.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawing shall be interpreted as illustrative and not in a limiting sense.

I claim:

In high pressure lubricating apparatus, a hollow lubricant fitting having a sealing surface, and a coupler comprising a nozzle having an opening and a guiding member attached to said nozzle, said guiding member having an opening adapted to receive said sealing surface, resilient packing material having a completely cylindric, axial passage larger than said opening in the nozzle and smaller than said opening in the guiding member, said material being contained in said member between said opening and nozzle, and rigid, hollow means associated with said passage and at least partially lining the same and abutting the nozzle and adapted to provide a second rigid sealing surface, said resilient material being adapted to expand into said passage when said coupler is applied to said fitting, the expansion being caused by the pressure reaction between nozzle and fitting said nozzle opening being unobstructed by said expansion and said opening in the guiding member permitting an angular relationship between the fitting and coupler while said packing maintains a seal.

FRANK S. BARKS.